(12) United States Patent
Leyva (10) Patent No.: US 9,335,414 B2
(45) Date of Patent: May 10, 2016

(54) FREQUENCY AGILE LADAR (71) Applicant: Raytheon Company, Waltham, MA (US)

(72) Inventor: Victor Leyva, Pasadena, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/329,420

(22) Filed: Jul. 11, 2014

(65) Prior Publication Data

US 2016/0011312 A1 Jan. 14, 2016

(51) Int. Cl.
G01C 3/08 (2006.01)
G01S 17/10 (2006.01)
G01S 17/89 (2006.01)

(52) U.S. Cl.
CPC ............. *G01S 17/102* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 4,995,720 A * | 2/1991 | Amzajerdian | 356/5.06 |
| 5,347,283 A * | 9/1994 | Krizek et al. | 342/201 |
| 5,418,905 A * | 5/1995 | Rarity et al. | 398/40 |
| 6,115,511 A | 9/2000 | Sakai et al. | |
| 6,327,063 B1 | 12/2001 | Rockwell | |
| 6,348,683 B1 * | 2/2002 | Verghese et al. | 250/214.1 |
| 6,853,452 B1 * | 2/2005 | Laufer | 356/436 |
| 7,474,685 B2 | 1/2009 | Kalayeh | |
| 8,891,566 B2 * | 11/2014 | Belsley | 372/28 |
| 2010/0225924 A1 * | 9/2010 | Kuramoto | 356/487 |
| 2010/0314545 A1 * | 12/2010 | Logan, Jr. | G01J 3/10 250/339.07 |
| 2011/0037965 A1 * | 2/2011 | Hintz | G01S 7/4802 356/4.01 |

OTHER PUBLICATIONS

Cosofret et al., "Frequency-Agile LIDAR Receiver for Chem-Bio Sensing;" Period of Performance: Aug. 2007 to Aug. 2009; http://www.psicorp.com/pdf/library/sr-1416.pdf ; 4 Pages.
Cosofret et al., "Frequency-Agile LIDAR Receiver for Chemical and Biological Agent Sensing;" Presentation by Physical Sciences, Inc.; http://www.psicorp.com/pdf/library/VG10-117.pdf; 20 Pages.
Prasad et al., "Tunable IR Differential Absorption Lidar for Remote Sensing of Chemicals;" Application of Lidar to Current Atmospheric Topics III, Proceedings from SPIE, vol. 3757; Jul. 1999; 9 Pages.

* cited by examiner

*Primary Examiner* — Luke Ratcliffe
*Assistant Examiner* — Samantha K Abraham
(74) *Attorney, Agent, or Firm* — Daly, Crowley, Mofford & Durkee, LLP (57) ABSTRACT

In one aspect, a frequency agile LADAR (laser detection and ranging) sensor includes a transmitter configured to provide laser pulses towards a target, a receiver configured to receive a reflected signal from the target and control circuitry configured to tune an optical frequency of a first laser pulse of the laser pulses to be different from an optical frequency of a second laser pulse of the laser pulses and tune an optical frequency of the receiver to be different than an optical frequency of a laser pulse most recently transmitted by the transmitter.

13 Claims, 7 Drawing Sheets

FREQUENCY AGILE LADAR

BACKGROUND

A LADAR (laser detection and ranging) sensor, sometimes referred to as a laser radar, uses laser beams to measure distances (or ranges) and instantaneous velocities. The LADAR sensor can be used to form three dimensional (3D) images of scenes with a high degree of definition (e.g., 15 cm or better range resolution at ranges greater than 1 km). LADARs may be mounted on stationary platforms or on moving platforms such as an aircraft, for example.

Photon counting LADAR are active imaging sensors that are sensitive to single photon returns and are used for 3D imaging at long ranges. Photon counting LADARs typically include a laser transmitter that generates an optical waveform, transmit optics to direct light to the target, receive optics to collect the light reflected/scattered by the target, and a photon sensitive imaging receiver to detect the light collected by the receive optics. Data from the collected light is processed to generate a 3D image of the target.

SUMMARY

In one aspect, a frequency agile LADAR (laser detection and ranging) sensor includes a transmitter configured to provide laser pulses towards a target, a receiver configured to receive a reflected signal from the target and control circuitry configured to tune an optical frequency of a first laser pulse of the laser pulses to be different from an optical frequency of a second laser pulse of the laser pulses and tune an optical frequency of the receiver to be different than an optical frequency of a laser pulse most recently transmitted by the transmitter.

In another aspect, an article includes a non-transitory machine-readable medium that stores executable instructions to control a transmitter and a receiver of a LADAR (laser detection and ranging) sensor. The instructions cause a machine to tune a transmitter to set an optical frequency of a first laser pulse to be different from an optical frequency of a second laser pulse; and tune an optical frequency of a receiver to be different than an optical frequency of a laser pulse most recently transmitted by the transmitter.

In a further aspect, a method includes setting, at a transmitter of a LADAR (laser detection and ranging) sensor, an optical frequency of a laser pulse and configuring an optical frequency of a receiver of the LADAR sensor to be different than the optical frequency of the laser pulse.

DETAILED DESCRIPTION

Figure 1:
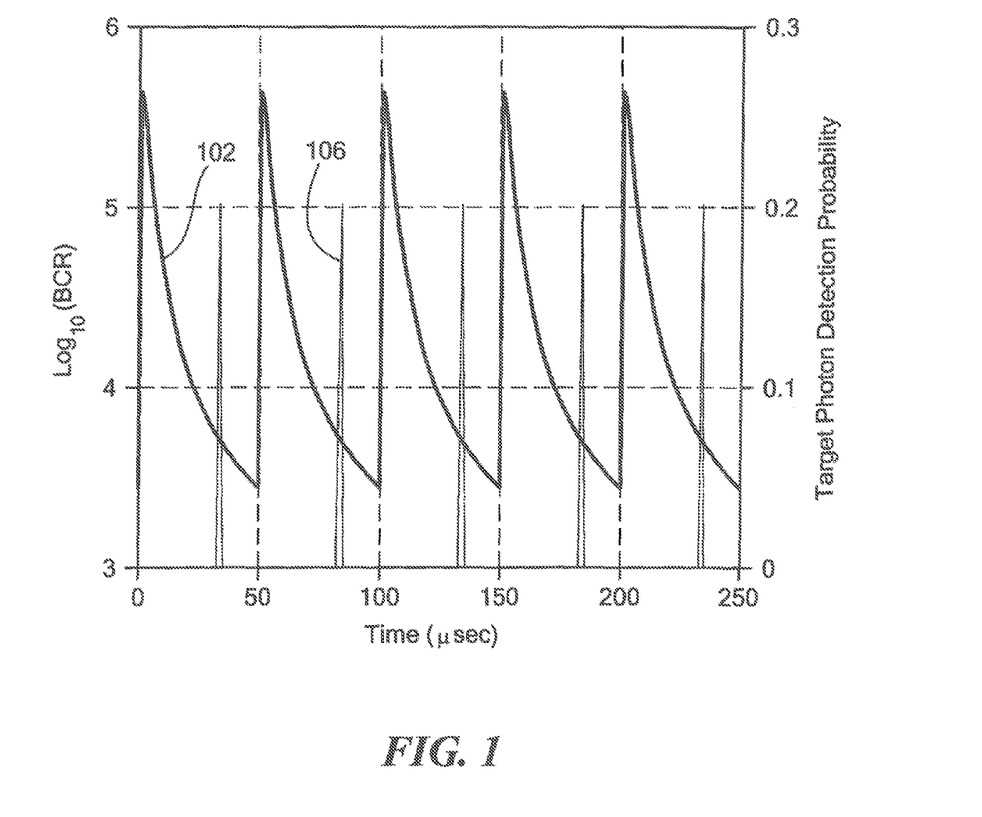
FIG. 1 is a graph depicting the number of photons detected by the LADAR from a target over time and a logarithm of the background count rate (BCR) noise due to optically backscattered photons over time.

Atmospheric optical backscatter occurs due to light scattering from molecules and aerosols. The optical backscatter from outgoing laser pulses is detected by the LADAR receiver and generates noise that limits the performance of photon counting Geiger Mode LADAR sensors. Detection of targets at long ranges requires high laser pulse energy, which increases the amount of detected optical backscattered photons. At long ranges there can be multiple laser pulses at one time along the path from a transmitter of the LADAR sensor to the target and back to a receiver of the LADAR sensor, increasing the level of backscattered photons. For example, in FIG. 1, the detected background count rate (BCR) noise over time due to the detection of atmospheric optical backscatter from outgoing laser pulses is shown where plot 102 represents the logarithm of the BCR. In this example the laser operates at a pulse repetition frequency (PRF) of 20 kHz which corresponds to a 50 microsecond period between pulses. The detected BCR from each outgoing laser pulse decreases as the inverse square of the distance between the sensor and each pulse. As such the BCR is primarily due to the closest outgoing laser pulse to the sensor. Over time, the BCR increases when a laser pulse leaves the sensor and decreases over time until the next outgoing laser pulse. Also shown in plot 106 is the probability of detecting a single photon from the target per detector per laser pulse. The probability of detection depends on many parameters including range, laser pulse energy, receiver optics, and atmospheric and target characteristics. In this example a typical detection probability of 0.2 (i.e., 20%) is shown. The probability of detecting a target photon should be larger than the probability of detecting a backscattered photon. Geiger Mode LADAR detectors operate (detect photons) during a range gate period. For a typical range gate period of 10 microsecond duration, a greater than 0.1 probability of having a background count detection corresponds to a BCR greater than $10^4$. Geiger Mode detectors only respond to the first photon detected during a range gate, after which they are blind to any subsequent photons incident on the detector. As shown in the FIG. 1, the BCR>$10^4$ over 50% of the time which would impact the ability of the LADAR to detect targets as it would be blinded if target photons arrived after any detected backscattered photons during this time.

One objective to improve LADAR performance is to attenuate the backscatter from the outgoing pulse from the transmitter of the LADAR sensor that is closest to the receiver of the LADAR sensor recognizing that the received optical backscatter signal decreases inversely as the square of the range of the pulse from the receiver. In addition, the LADAR sensors are sensitive and can be damaged or blinded by backscatter by outgoing laser pulses from within the LADAR sensor due to common path transmit and receive optics. These noise sources limit the range at which the LADAR sensors can operate.

Described herein are techniques to use a frequency agile LADAR to reduce both detected photons from outgoing pulses optically backscattered in the atmosphere and from detected photons scattered from within the LADAR sensor. In one example, an optical frequency of a LADAR transmitter hops between two or more optical frequencies. The tunable LADAR receiver is tuned to receive optical pulses from the target while at the same time blocking optical backscatter from the nearest outgoing pulse from the LADAR transmitter.

A pulse train that hops in optical frequency can also be used to remove the range ambiguity that occurs when the range is only known to within a multiple of the range separation between pulses The techniques described herein also protect a camera with the LADAR from optical damage by providing increased optical isolation of the receiver from the outgoing laser pulses.

Figure 2:
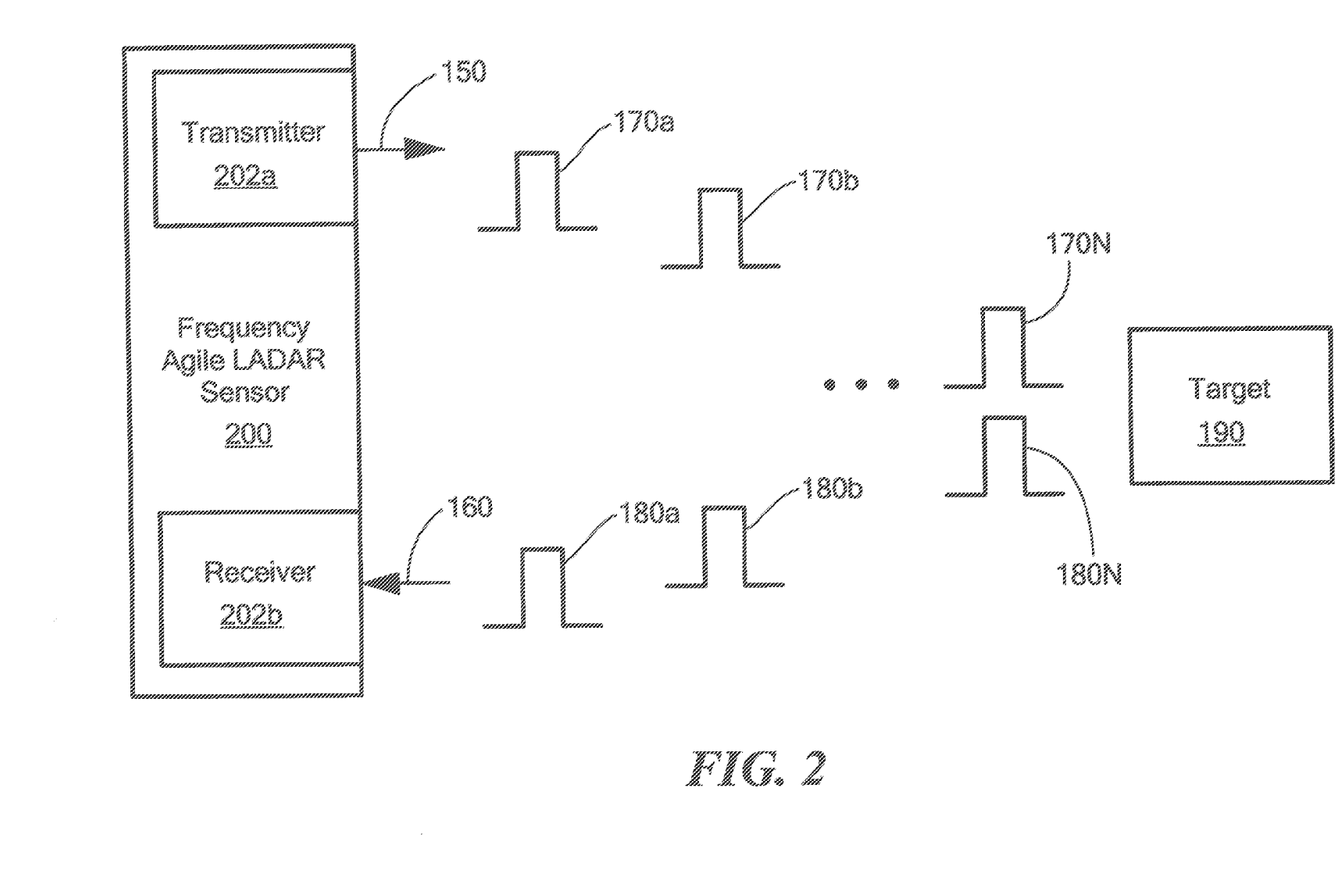
FIG. 2 is block diagram of a frequency agile LADAR sensor and a target.

Referring to FIG. 2, a frequency agile LADAR sensor 200 includes a transmitter 202a and a receiver 202b. The LADAR sensor 200 is sensitive to single photon detection. LADAR sensor 200 determines range using time of flight pulse information. The transmitter 202a transmits pulses of laser light or optical pulse signals (e.g., transmitted pulse signals 170a-170N) to a target 190 from an output port 150. The receiver 202b receives the reflected signals (e.g., reflect signals 180a-180N) from the target at an input port 160. The frequency agile LADAR 200 is configured to ensure that the optical frequency of the last transmitted pulse 170a is different from the optical frequency of the reflected signal 180a that is next to be received by the sensor 200.

Figure 3:
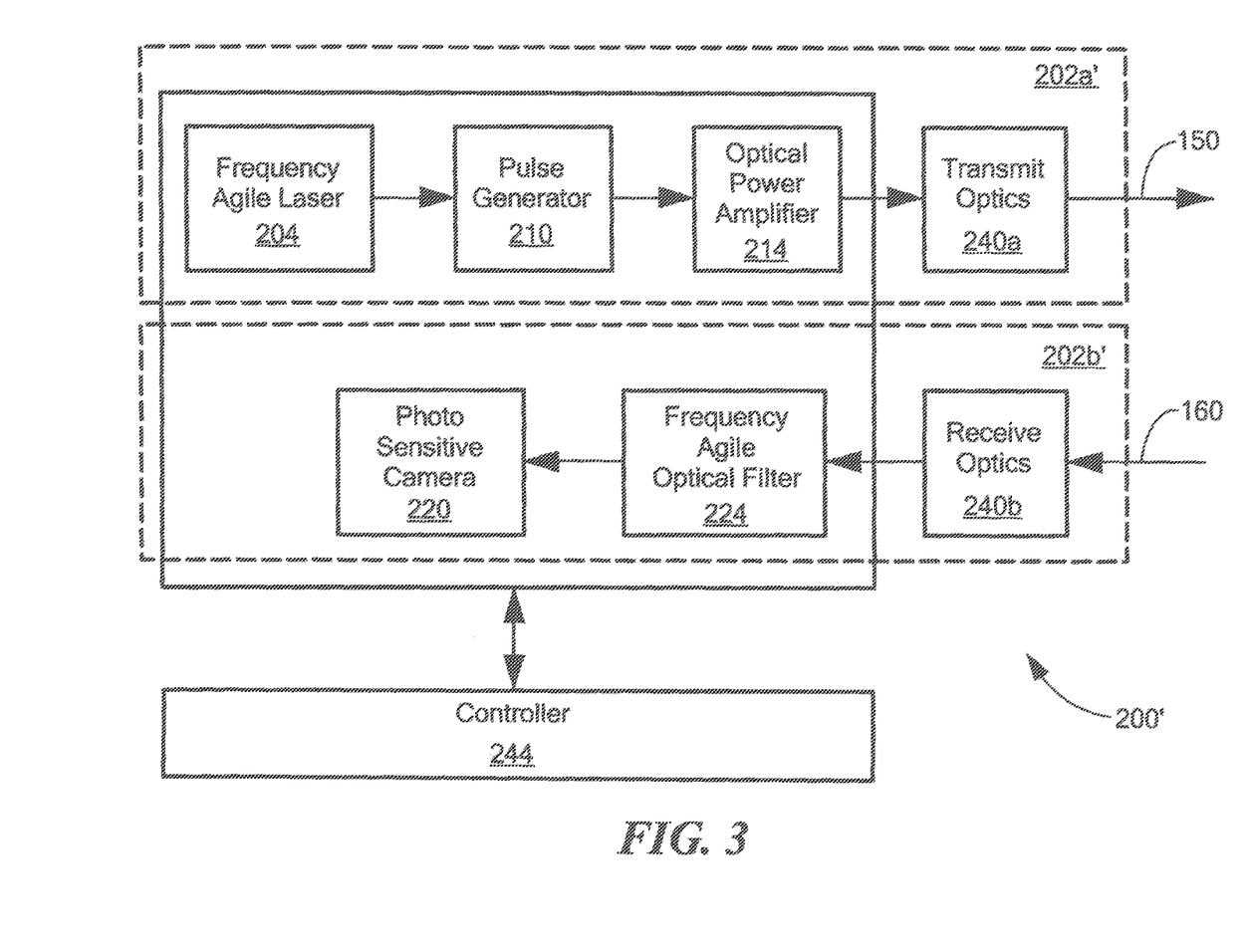
FIG. 3 is a block diagram of an example of the frequency agile LADAR sensor.

Referring to FIG. 3, an example of the frequency agile LADAR sensor 200 is a frequency agile Geiger mode LADAR sensor 200'. The frequency agile Geiger mode LADAR sensor 200' includes a transmitter 202a', a receiver 202b' and a controller 244. The transmitter 202a includes a frequency agile laser 204, a pulse generator 210, an optical power amplifier 214 and transmit optics 240a. The receiver 202b' includes a photon sensitive camera 220, a frequency agile optical filter 224, and receive optics 240b.

The frequency agile laser 204 modulates an optical carrier frequency or wavelength of the transmitted light. In one example, the frequency agile laser 204 is a single device that is configured to tune its optical frequency (e.g., a Distributed Bragg Reflector (DBR) diode laser). In another example, the frequency agile laser 204 includes two discrete lasers at different optical frequencies whose output can be alternately switched between each laser. In one example, laser(s) is actively locked to etalon peaks and stabilized to be within atmospheric transmission bands. In one particular example, the laser is locked to etalon peaks by tapping off a signal from the laser and transmitted through the etalon.

The pulse generator 210 generates a short pulse of light (e.g., 1 nanosecond pulse width) from the continuous wave light from the frequency agile laser 204 by modulating the light on and off. In one example, the pulse generator 210 uses a fiber coupled electro optic Mach Zhender Interferometer (MZI).

The optical power amplifier 214 boosts the pulse energy. Transmit optics 240a direct the light to the target. Receive optics 240b collect the light reflected from the target. In one example, the receive optics 240b are similar to the transmit optics 240a.

The frequency agile optical filter 224 is a tunable optical filter that is used to transmit light at one optical frequency while attenuating light at a second optical frequency. For example, the frequency agile optical filter 224 attenuates an optical frequency of a pulse transmitted by the LADAR transmitter 202a while allowing light of another optical frequency reflected from the target to be received by the receiver 202b. Thus, both backscatter noise from within the sensor 200' and atmospheric backscatter noise from the outgoing pulse closest to the receiver 202b (e.g., the transmitted pulse signal 170a in FIG. 2) can be attenuated by transmitting at a different optical frequency than what the frequency agile optical filter 224 is tuned to receive. In one example, the frequency agile optical filter 224 is a tunable Fabry Perot Etalon. A tunable etalon filter can increase the solar background rejection when used with a fixed bandpass filter.

The controller 244 is configured to control the transmitter and the receiver (e.g., a transmitter 202a' and a receiver 202b'). In one example, the controller 244 determines the timing of the pulses transmitted from the LADAR sensor 200'. The controller 244 also provides wavelength stabilization and other LADAR processing. In one example, the controller 244 performs a process such as a process 500 described with FIG. 5.

Figure 4:
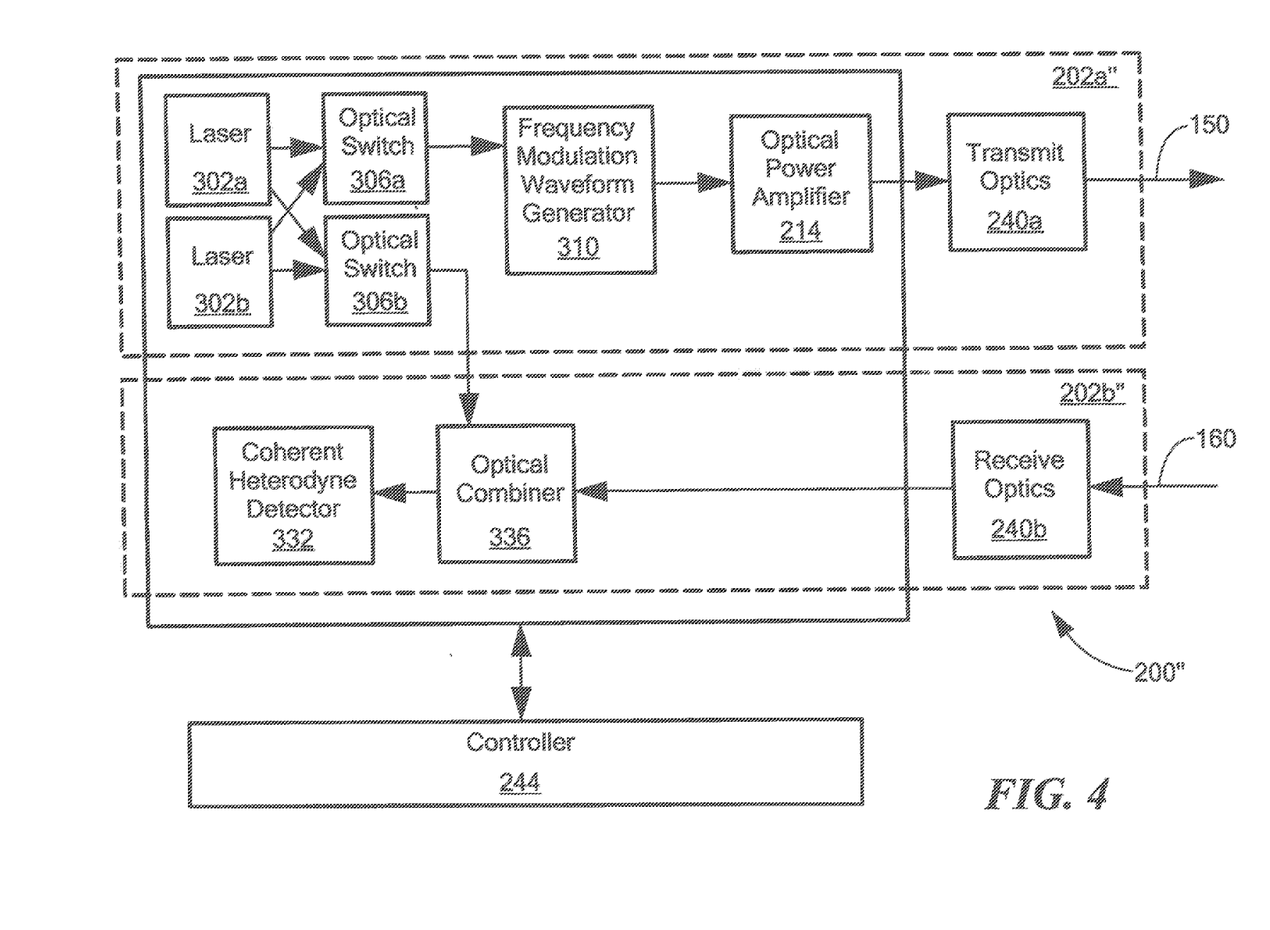
FIG. 4 is a block diagram of another example of the frequency agile LADAR sensor.

Referring to FIG. 4, another example of the frequency agile LADAR 200 is a frequency agile coherent LADAR sensor 200". The coherent LADAR sensor includes a transmitter 202a", a receiver 202b" and the controller 240.

The transmitter 202a" includes lasers (e.g., a laser 302a, a laser 302b), optical switches (e.g., optical switch 306a, optical switch 306b), a frequency modulation waveform generator 310, an optical power amplifier 214 and the transmit optics 240a.

The receiver 202b" includes an optical combiner 336, a coherent heterodyne detector 332, the transmit/receive optics 240 and the receive optics 240b.

In one example, the lasers 302a, 302b are continuous wave lasers that are offset in optical frequency. The lasers 302a, 302b are typically stabilized (e.g., externally) for low frequency noise operation. One approach is to lock the lasers 302a, 302b to the same high finesse external optical cavity. The outputs of each laser 302a, 302b is split into two paths: one path for a local oscillator path and the other path for a transmit path.

In one example, the optical switches 306a, 306b are each 2×1 optical switches. The optical switches 306a, 306b are used to select which optical frequency is in the local oscillator path and which is in the transmit path at any instant. For example, in order to attenuate optical backscatter noise, when the laser 306a is selected for the transmit path, the laser 306b is selected for the local oscillator path.

The selected transmitted optical frequency undergoes frequency modulation by the frequency modulation waveform generator 310 and is amplified by the optical power amplifier 214. The resultant signal passes through the transmit optics 240a and is transmitted to the target.

The reflection of the transmitted signal from the target is received by the receive optics 240b. The optical combiner 336 combines the signal from the laser selected for the local oscillator path with reflected signal from the target. The collected light is heterodyne mixed by the coherent heterodyne detector 332 with the selected local oscillator at the same optical frequency. Thus, the backscattered light is at a different optical frequency, which is mixed at an optical frequency much higher than the detector bandwidth. For example, if the detector has a bandwidth of 500 MHz, a difference of laser frequencies of several GHz will ensure that the beat signal will be attenuated. Range information may be determined when the return light is heterodyne mixed with a local oscillator.

While FIG. 4 depicts two lasers, one of ordinary skill in the art would recognize that additional lasers may be added as well as additional optical switches so that the optical frequency hopping of the transmitter can occur for more than two frequencies.

Figure 5:
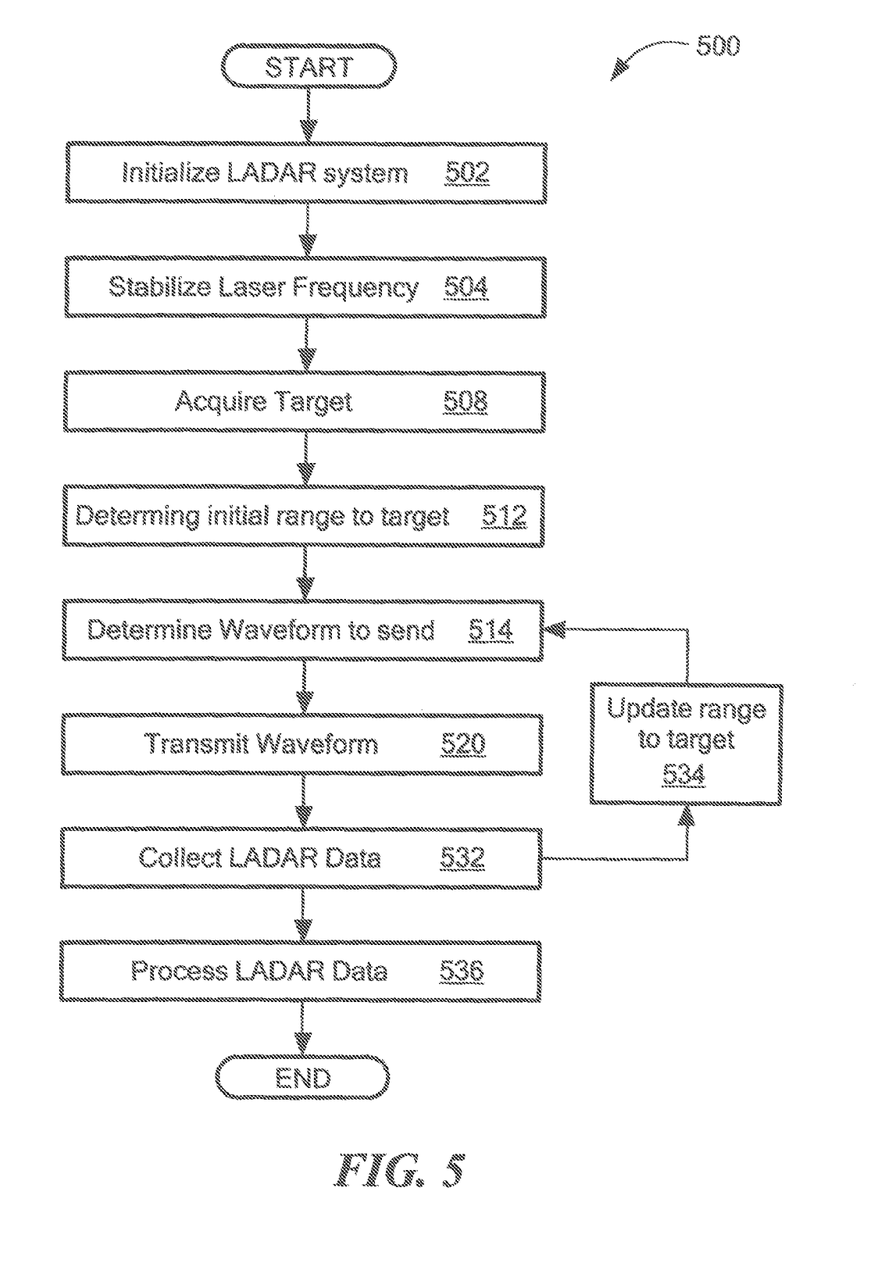
FIG. 5 is a flowchart of an example of a process to perform processing at the frequency agile LADAR sensor.

Referring to FIG. 5, an example of a process to control a frequency agile laser 200 (e.g., LADAR sensor 200' and LADAR sensor 200") is a process 500. Process 500 initializes the LADAR sensor (502) and stabilizes the laser frequency (504). For example, the laser frequency can be locked or stabilized to the peaks of a temperature stabilized Fabry Perot Etalon using the Pound Dreyer Hall Laser Stabilization approach (see, for example, Dreyer, R. W. P. (1983), "Laser phase and frequency stabilization using an optical resonator" *Appl Phys B* 31 (2): 97).

Process 500 acquires the target (508) and determines an initial range to the target (512). For long range targets, there is a range ambiguity of n*(1/PRF) where n is an integer corresponding to the number of pulses in the air between the sensor and the target. One approach to remove this ambiguity is to vary the PRF to the target to determine a unique value of n. In a frequency agile LADAR a unique pulse frequency sequence can transmitted and detected at the round trip delay time to determine the absolute range to the target.

Process 500 determines waveform to send (514). There are multiple pulse waveforms that may be used. For example, the waveform may be defined by an optical frequency pattern or sequence of the transmitted pulses. In one particular example, if there are an even number of pulses between the LADAR sensor and the target, the transmitter 202*a* and the receiver 202*b* may be each tuned every other pulse. One waveform that minimizes the tuning bandwidth of the LADAR sensor is when the laser and receiver are tuned in optical frequency between two values every (n−1) pulses, where n is the number of pulses between the LADAR sensor and the target. The value of n is determined by the target range and the laser PRF. This ensures that the backscatter from the outgoing pulse closest to the receiver is blocked by the receiver. Since the target range varies and is being tracked, the waveform changes as the number of pulses between the LADAR and the target changes (e.g., from odd number of pulse to an even number of pulses).

Figure 7:
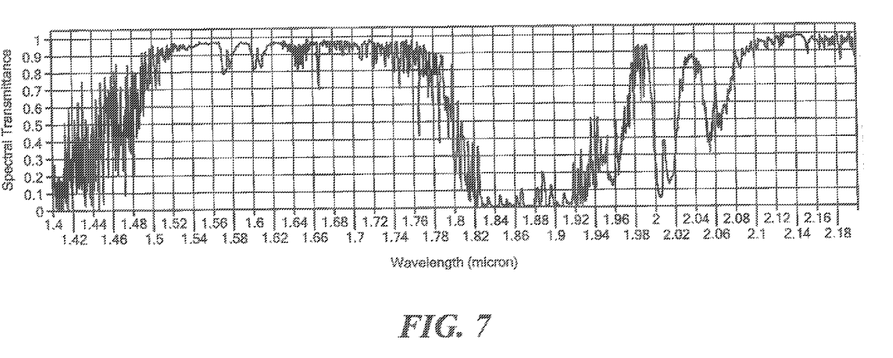
FIG. 7 is a graph of the spectral optical transmission of the atmosphere versus wavelength.

Process 500 transmits the waveform (520). For example the controller 244 tunes the laser and enables the transmitter to transmit the waveform. The controller 244 also tunes the receiver to reduce backscatter from a most recent transmitted pulse. The required frequency offset is determined by the attenuation or isolation a filter provides away from its maximum transmission. For example, a Fabry Perot Etalon with a finesse of 100 can provide up to 30 dB isolation at an optical frequency halfway between its transmission peaks (half of the Free Spectral Range). For long range sensor operation, the optical frequencies may be within high atmospheric transmission bands. These optical atmospheric transmission bands may be a very narrow band. FIG. 7 depicts the spectral optical transmission of the atmosphere between 1.4 microns and 2.2 microns that demonstrates narrow band optical transmission features.

Process 500 collects LADAR data (532) and processes the LADAR data (536). For example, the LADAR data is used to generate 3D images. Process 500 updates the range to target (534) (using, for example, the LADAR data collected in processing block 532) and repeats processing block 514.

Figure 6:
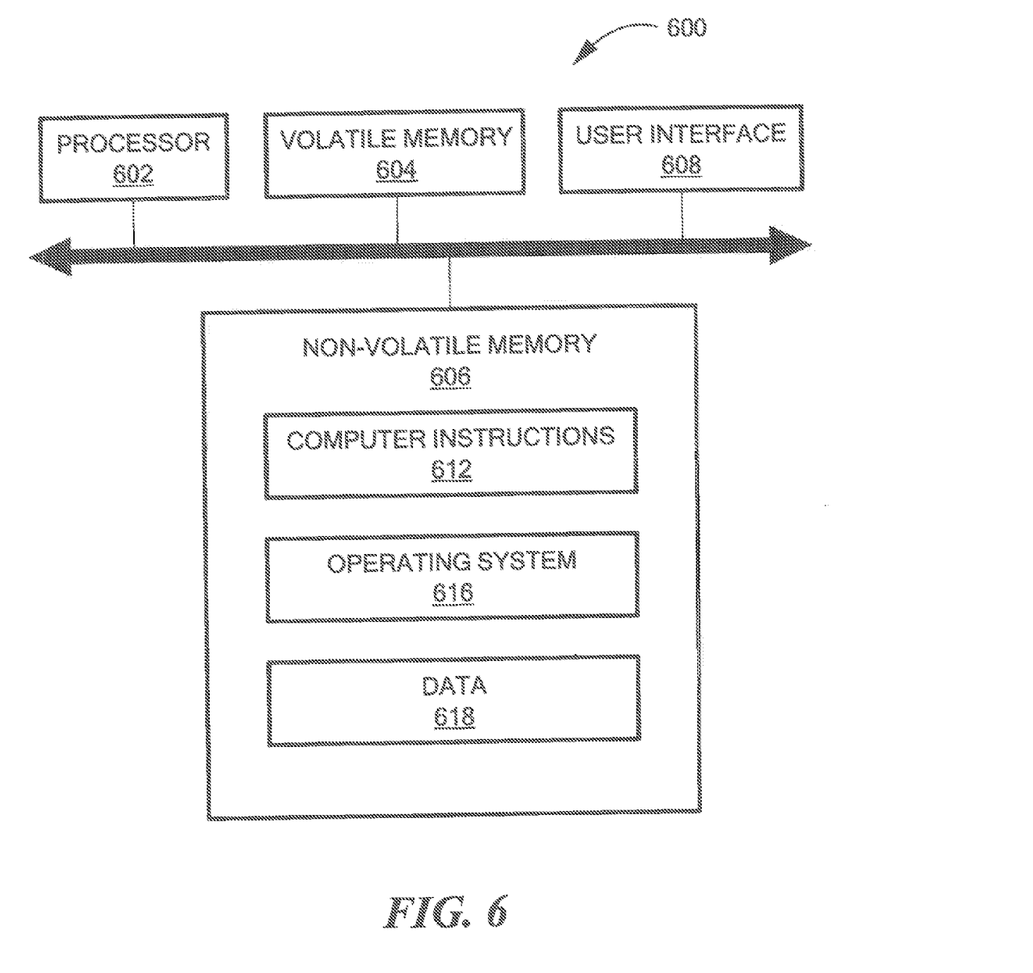
FIG. 6 is a computer on which all or some of the process of FIG. 5 may be implemented.

Referring to FIG. 6, an example of the controller 244 is a computer 600. The computer 600 includes a processor 602, a volatile memory 604, a non-volatile memory 606 (e.g., hard disk), a user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604 to perform all or part of the process 500.

The processes described herein (e.g., the process 500) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 500 is not limited to the specific processing order of FIG. 5. Rather, any of the processing blocks of FIG. 5 may be re-ordered, combined or removed, performed in parallel or in serial, as necessary, to achieve the results set forth above.

The processing blocks in FIG. 5 associated with implementing the system may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A frequency agile LADAR (laser detection and ranging) sensor, comprising:
    a transmitter configured to provide laser pulses towards a target, the transmitter comprising:
        a frequency agile laser configured to modulate an optical carrier frequency or wavelength of continuous wave light;

a pulse generator configured to generate a pulse light from the continuous wave light from the frequency agile laser by modulating on and off;

an optical power amplifier configured to increase the pulse energy from the pulse light received from the pulse generator; and transmit optics configured to direct the increased light from the optical amplifier as the laser pulses towards the target;

a receiver configured to receive a reflected signal from the target, the receiver comprising:

receive optics configured to collect light from the reflected signal;

a frequency agile optical filter configured to be a tunable optical filter, the frequency agile optical filter being further configured to receive the collected light and to transmit light at first optical frequency while attenuating light at a second optical frequency; and a photo sensitive camera configured to receive light from the frequency agile optical filter; and control circuitry configured to:

tune the frequency agile laser to set an optical frequency of a first laser pulse of the laser pulses to be different from an optical frequency of a second laser pulse of the laser pulses; and tune the frequency agile optical filter to set an optical frequency of the receiver to be different than an optical frequency of a laser pulse most recently transmitted by the transmitter.

2. The sensor of claim 1, wherein the control circuitry comprises at least one of a processor, a memory, programmable logic and logic gates.

3. The sensor of claim 1 wherein the frequency agile laser is a Distributed Bragg Reflector (DBR) diode laser.

4. The sensor of claim 1 wherein the frequency agile laser comprises two discrete lasers each set at different optical frequencies.

5. The sensor of claim 1 wherein the frequency agile laser is actively locked to etalon peaks and stabilized to be within atmospheric transmission bands.

6. The sensor of claim 1 wherein the frequency agile laser is a system that comprises:

a first laser having a first optical frequency;

a second laser having a second optical frequency;

a first optical switch connected to the first and second lasers; and a second optical switch connected to the first and second lasers, wherein the first and second optical switches are used to select a first laser for a transmit path and to select a second laser for a local oscillator path.

7. The sensor of claim 6, wherein the first and second lasers are continuous wave lasers that are offset in optical frequency.

8. The sensor of claim 1 wherein the frequency agile LADAR sensor is a photon counting frequency agile LADAR sensor.

9. A method, comprising:

setting, at a transmitter of a LADAR (laser detection and ranging) sensor, an optical frequency of a laser pulse at a first optical frequency;

modulating an optical carrier frequency or wavelength of continuous wave light;

generating a pulse light from the continuous wave light by modulating on and off;

increasing the pulse energy from the pulse light received; and directing the increased light as laser pulses towards a target comprising a transmitting a first laser pulse of the laser pulses to have a first optical frequency;

configuring an optical frequency of a receiver of the LADAR sensor to be different than the first optical frequency of the first laser pulse transmitted;

collecting light from a reflected signal from the target; and transmitting the collected light to a photo sensitive camera at a second optical frequency while attenuating light at the first optical frequency.

10. The method of claim 9, wherein configuring an optical frequency of a receiver comprises tuning the receiver to reduce backscatter from a most recent transmitted pulse.

11. The method of claim 9, further comprising:

acquiring a target;

determining an initial range to the target; and determining a waveform to transmit.

12. The article of claim 11, further comprising:

collecting LADAR data;

processing the LADAR data; and updating the range to target using the LADAR data.

13. The article of claim 12, further comprising instructions generating 3D (three-dimensional) images.

* * * * *